June 15, 1926.  1,589,166
H. HONER
GAS STOVE
Filed Oct. 26, 1925
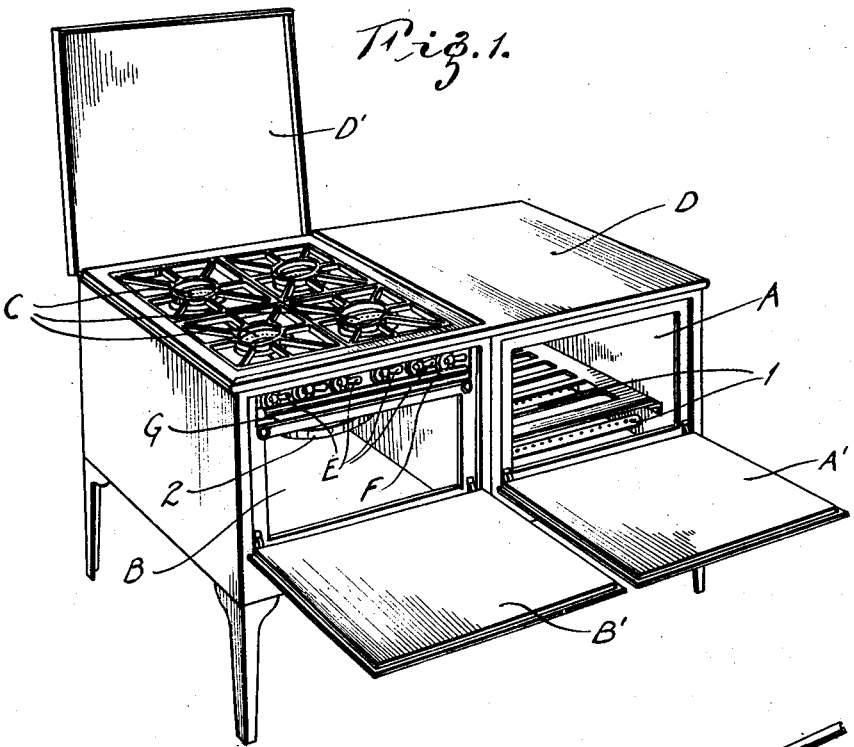
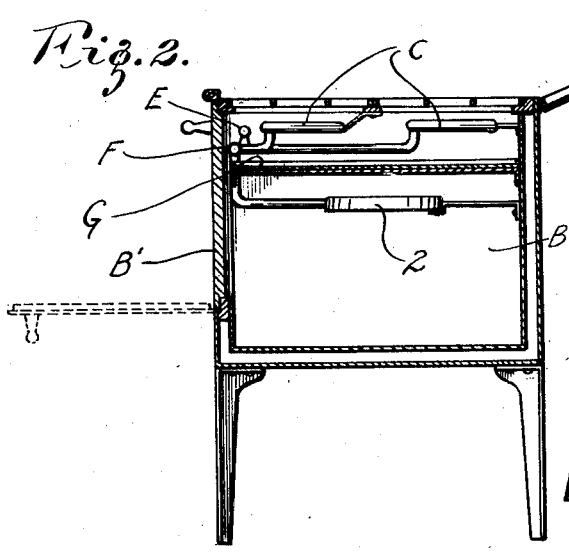
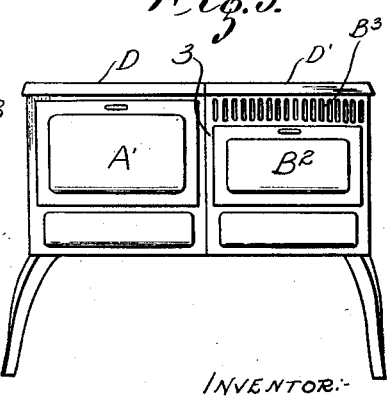
INVENTOR:-
HENRY HONER.
BY Bakewell & Church
ATTORNEYS Patented June 15, 1926.

1,589,166

UNITED STATES PATENT OFFICE.

HENRY HONER, OF BELLEVILLE, ILLINOIS, ASSIGNOR OF ONE-HALF TO ADOLPH J. HONER, OF BELLEVILLE, ILLINOIS.

GAS STOVE.

Application filed October 26, 1925. Serial No. 64,893.

This invention relates to gas stoves of the type that are provided with a baking oven, a broiling oven and a cooking top that comprises a plurality of burners over which cooking utensils are adapted to be arranged.

The object of my invention is to provide a gas stove of the general type referred to that presents a neat and symmetrical appearance and which is so constructed that the top burners and the gas cocks or controlling valves are completely hidden from view when the stove is not being used for cooking purposes. To this end I have devised a gas stove in which the baking oven and broiling oven are arranged side by side, the top burners are arranged in a burner space over the broiling oven under a hinged table top that is adapted to be swung upwardly into an inoperative position or arranged horizontally flush with the stationary table top positioned over the baking oven, and means is provided at the front of the stove for closing the space in which the top burners are arranged.

Figure 1 of the drawings is a perspective view of a stove constructed in accordance with my invention.

Figure 2 is a vertical sectional view, taken through the broiling oven; and

Figure 3 is a front elevational view, illustrating another form of my invention.

Referring to Figures 1 and 2 of the drawings, which illustrate one form of my invention, A and B designate the baking oven and broiling oven, respectively, which are arranged side by side, C designates a plurality of top burners arranged in a burner space over the broiling oven, D designates a stationary table top arranged over the baking oven and D' designates a hinged table top arranged so as to cover the top burners when they are not in use, said hinged table top being adapted to be arranged in a horizontal position flush with the stationary table top D, or swung upwardly into an inoperative position, as shown in Figure 1, when the top burners are in use.

The valves or cocks E which control the supply of gas to the baking oven burners 1, to the broiling oven burners 2 and to the top burners C are mounted on a gas manifold F arranged at the front end of the burner space, as shown in Figure 1, and a conventional drip pan C is arranged under the top burners. In order that the stove will normally present a neat appearance when it is not being used for cooking purposes, the broiling oven is provided with a door B' which is so proportioned that when it is arranged in its closed position it closes the front end of the burner space and conceals the gas manifold, the controlling cocks thereon and the front edge of the drip pan that is arranged under the top burners. The baking oven is provided with a door A' of substantially the same dimensions as the broiling oven door, and said doors can be hinged in any preferred manner, but preferably at their lower edges, so that they can be swung downwardly, as shown in Figure 1.

The portion of the cooking top that is used to support the cooking utensils over the top burners C can either be of skeleton-like construction, as herein illustrated, or it can be of the solid type and provided with removable lids arranged over the top burners. The particular construction of the various elements of the stove is immaterial, as the novelty of my invention consists in the way the various elements are combined and arranged so as to produce a stove of symmetrical and attractive appearance that is capable of being used as a table, and in which the parts that ordinarily detract from the appearance of a gas stove, such as the top burners, the controlling cocks and gas manifold and drip pan, are completely hidden from view when the top burners of the stove are not in use.

While I prefer to design the door of the broiling oven so that it serves as a closure for the front of the space in which the top burners are arranged, it is not essential that the stove be constructed in this particular manner, for if desired, the stationary frame 3 which surrounds the door $B^2$ of the broiling oven can be provided with a portion $B^3$ that serves as a closure for the front end of the burner space, which portion $B^3$ may consist of a panel or grill, as shown in Figure 3. It is not essential that the baking oven be arranged at the right hand side of the stove and the broiling oven at the left hand side of the stove, as shown in Figure 1. Therefore, in Figure 3 I have shown the baking oven as being arranged at the left hand side of the stove and the broiling oven arranged at the right hand side of the stove.

I am aware of the fact that it has heretofore been proposed to equip a gas stove with a baking oven and a broiling oven of the same height, arranged side by side and located under a cooking top that extends across the entire width of the stove, but my stove is distinguished from a stove of the kind just referred to, in that the cooking top composed of the top burners C comprises only one-half of the top portion of the stove, and is arranged over a broiling oven which is of less height than the baking oven, thereby making it possible to conceal the top burners, gas cocks and manifold by means of a hinged table top and a closure for the front end of the burner space which may either consist of a stationary panel or grill or an integral portion of the door for the broiling oven.

Having thus described my invention, what I claim as new and desire to secure by Letters Patent is:

1. A gas stove, comprising a baking oven and a broiling oven arranged side by side, top burners arranged in a burner space over the broiling oven, a table top extending over said burner space and adapted to be arranged in an inoperative position when the top burners are being used, controlling valves for the various burners of the stove, and closures for said ovens and for the front end of the said burner space.

2. A gas stove, comprising a baking oven and a broiling oven arranged side by side, a burner space arranged above only one of said ovens and equipped with top burners and controlling valves, a stationary table top over one of said ovens, a hinged table top over the burner space, and closures for said ovens and for the front end of said burner space.

3. A gas stove, comprising a baking oven and a broiling oven arranged side by side, top burners arranged over one of said ovens, a table top over said ovens comprising a stationary portion and a movable portion that is adapted to be arranged in an inoperative position when the top burners are being used, controlling valves for the various burners of the stove, and a door for one of said ovens provided with an integral portion that hides said controlling valves when said door is in its closed position.

4. A gas stove, comprising a baking oven and a broiling oven arranged side by side, a burner space above the broiling oven equipped with top burners and controlling valves, a stationary table top over the baking oven, a hinged table top over the burner space, and doors at the front side of the stove for closing said ovens, one of said doors having an integral portion for closing the front end of said burner space.

5. A gas stove, comprising baking and broiling ovens arranged side by side, top burners arranged over the broiling oven, a table top comprising a hinged portion arranged over said top burners, a gas manifold at the front side of the burner space above the broiling oven provided with controlling valves, and hinged doors for said ovens, the door of the broiling oven having an integral portion that conceals said manifold and controlling valves and closes the front end of the burner space when said door is in its closed position.

HENRY HONER.